Sept. 7, 1943. H. H. WHEELER 2,329,169
FILLER FEED FOR CIGAR MAKING MACHINES
Filed April 15, 1939 2 Sheets-Sheet 1
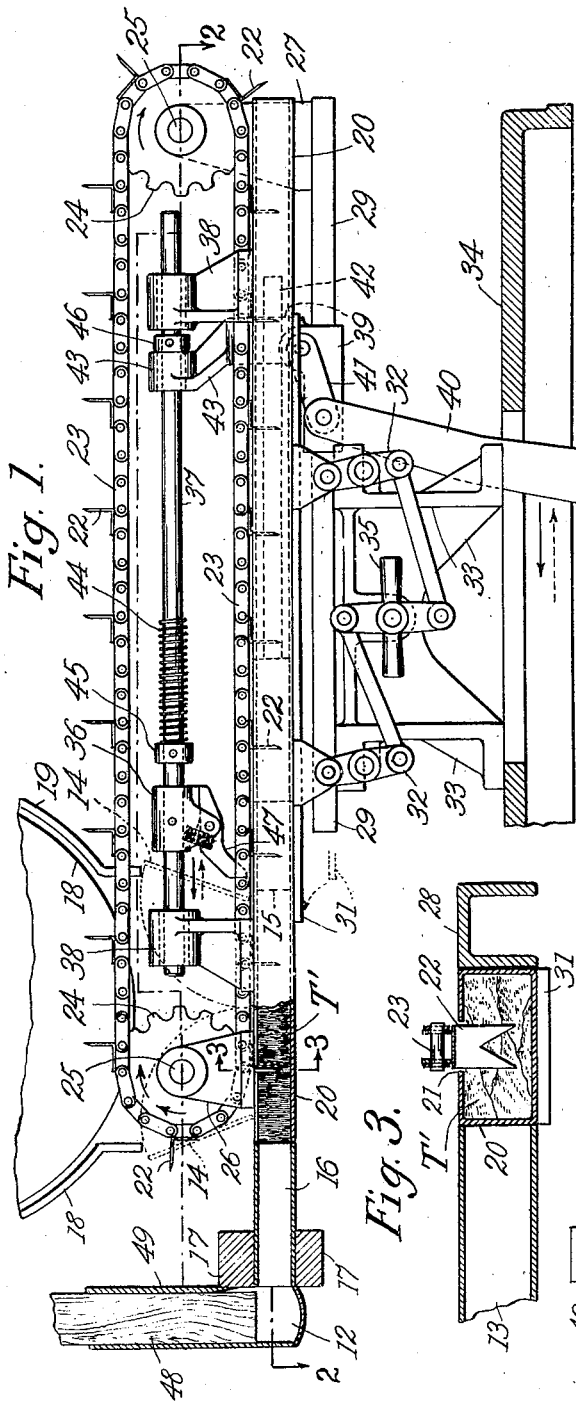
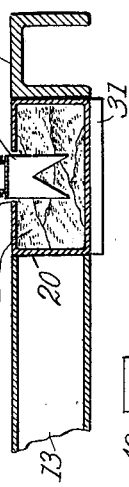
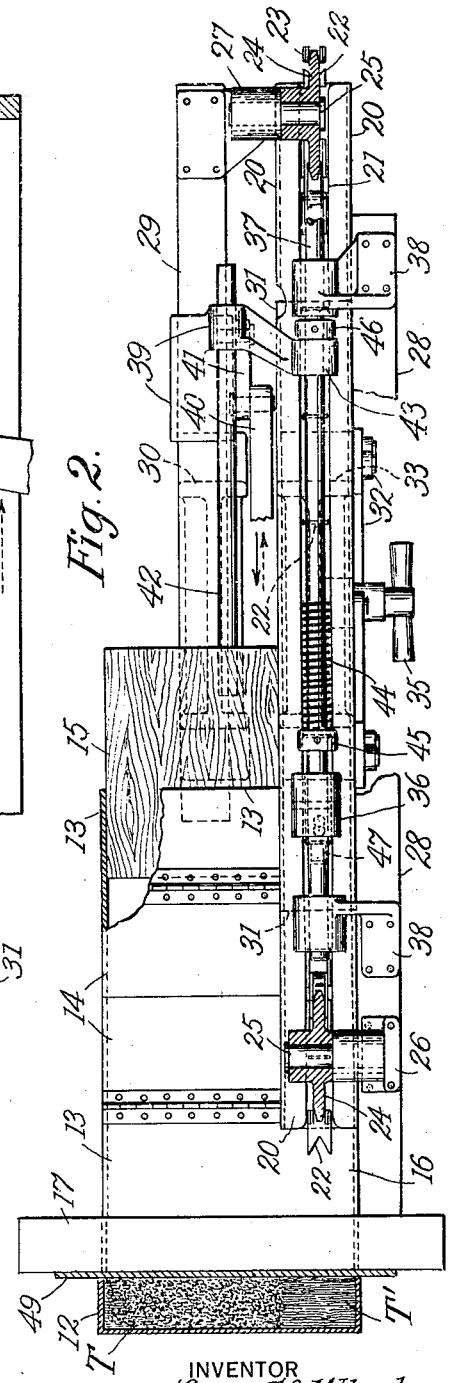
INVENTOR
Henry H. Wheeler
BY George S. Hastings
ATTORNEY Sept. 7, 1943.  H. H. WHEELER  2,329,169
FILLER FEED FOR CIGAR MAKING MACHINES
Filed April 15, 1939  2 Sheets-Sheet 2
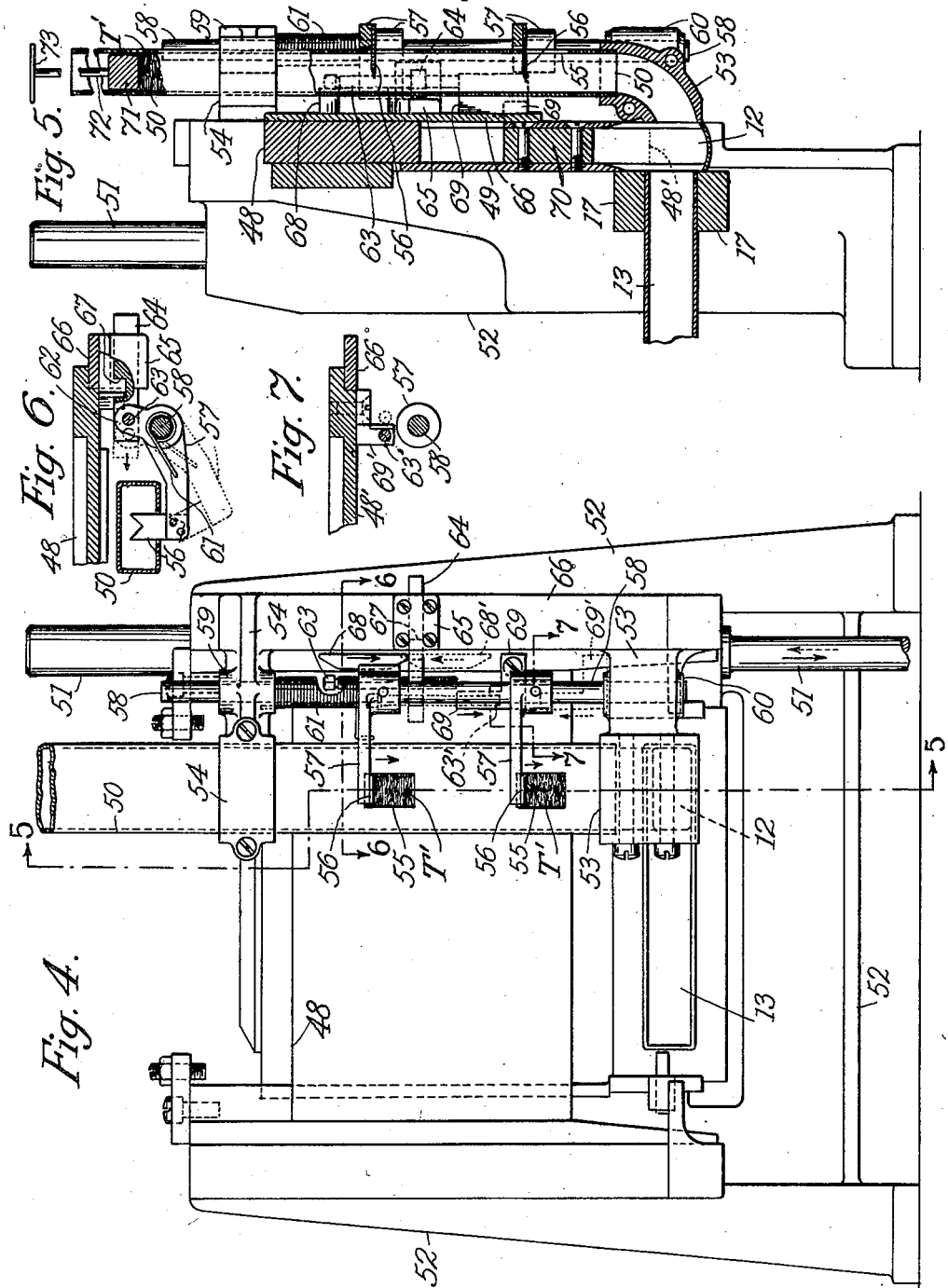
INVENTOR
Henry H. Wheeler
BY Georges Hastings
ATTORNEY Patented Sept. 7, 1943

2,329,169

UNITED STATES PATENT OFFICE 2,329,169

FILLER FEED FOR CIGAR-MAKING MACHINES

Henry H. Wheeler, Brooklyn, N. Y., assignor to International Cigar Machinery Company, a corporation of New Jersey Application April 15, 1939, Serial No. 267,957

12 Claims. (Cl. 131—81)

This invention relates to filler feeds for cigar making machines, one of its objects being to provide for feeding long-filler tobacco or a different grade of tobacco to the head end of a scrap bunch charge while the charge transfer of the scrap bunch machine is being filled with a charge. This object in the present invention is achieved by mounting a detachable magazine of the proper cross-section, which has previously been filled with long-filler tobacco or the desired different grade of tobacco, so as to register with the head portion of the charge transfer, and by arranging suitable fingers which dip into the said magazine to move in unison with the compactor of the scrap tobacco feed, so that proportional amounts of long and short filler are fed simultaneously into the charge transfer. The scrap feed, of course, has then to be narrowed so as to only supply the remaining portion of the bunch.

A further object is to provide an automatic filler feed. If the entire scrap feed delivery is removed from the machine and the long-filler magazine is made wide enough to cover the entire width of the cutting chamber, the same arrangement may be employed to make long-filler cigars in a magazine type bunch machine.

In the accompanying drawings which form a part of this specification and in which like characters of reference indicate the same or like parts:

Fig. 1 is a side elevation of a long filler feed applied to a scrap bunch machine, with the long-filler magazine arranged horizontally;

Fig. 2 is a top view on line 2—2 of Fig. 1;

Fig. 3 is an enlarged cross-section on line 3—3 of Fig. 1;

Fig. 4 is a side elevation of a long-filler feed for a scrap bunch machine, with the long-filler magazine arranged vertically;

Fig. 5 is an end elevation on line 5—5 of Fig. 4;

Fig. 6 is a plan view on line 6—6 of Fig. 4;

Fig. 7 is a cross-section on line 7—7 of Fig. 4.

Referring to Figs. 1 and 2, the numeral 12 indicates the charge-cutting chamber of a scrap bunch machine such as that disclosed in Reissue Patent 20,334 to F. C. Gladeck, etc., reissued April 20, 1937, Fig. 1 corresponding to Fig. 7, and Fig. 2 corresponding to Fig. 6 of the said patent. Heretofore the chamber 12 was charged uniformly across its entire width by the delivery mechanism of the scrap feed, as shown in the patent above referred to. In order to make scrap bunches with long-filler heads, the delivery mechanism of the scrap feed is made narrower by the desired amount and the removed portion replaced by an auxiliary long-filler feed which is actuated by the driving means of the scrap feed so as to operate in unison with the same.

The measuring chamber 13 of the scrap tobacco feed, with its upwardly swinging gates 14 and its charge-compressing plunger 15, is cut away to a width corresponding with the portion of the bunch length required to be of scrap tobacco T, as shown in Fig. 2. A short portion 16 near the ledged block 17 is left the original full width. To maintain the desired proportion of scrap tobacco supply, the feed scoop within the drum 18 and the discharge opening of the drum housing 19 are provided with partition walls or filler blocks to reduce their effective width to the size of the narrowed measuring chamber.

Into the space obtained by narrowing the measuring chamber and plunger is inserted the end of a tube magazine 20 filled with long-filler tobacco T' cut to length by a machine such as described in U. S. Patent 1,516,828, issued November 25, 1924, to R. E. Rundell. The magazine 20 in this case is of rectangular cross-section having a short side equal to the height of the measuring chamber 13 and provided in one long side with a slot 21 extending along the entire length of the magazine. Into this slot enter the propelling fingers 22 when the magazine is placed in operating position on the bunch machine.

The fingers 22 are carried at spaced intervals by an endless chain 23 running over sprockets 24 turning on shafts 25 held by bearings 26 and 27 resting on a support rail 28 and on the slide bar 29 of the scrap bunch machine, respectively, the slide bar 29 being attached to a pedestal 30. In order to permit the fingers 22 to enter the magazine, a platform 31 is provided supported by a parallel motion mechanism 32 from a pedestal 33 on the table 34 of the machine. After a new magazine has been placed upon this platform when in the dotted position, the same is raised into operating position by turning the handle 35 of the parallel motion mechanism. As the magazine is raised, the fingers 21 enter between the tobacco layers and dig into the tobacco mass in the magazine, as shown in Fig. 3.

The chain 23 is intermittently driven in synchronism with the plunger 15 by a pusher 36 attached to a shaft 37 slidable in bearings 38 affixed to support rail 28. The shaft 37 is actuated by the slide 39 which is controlled by cam lever 40 through link 41 and which operates the rod 42 of plunger 15 in the manner described in the scrap bunch machine patent referred to above. Slide 39 for this purpose is equipped with an arm 43 which terminates in a sleeve slidable on shaft 37. As the slide commences its comparatively long forward stroke required for the scrap feed, the sleeve of arm 43 slides idly on shaft 37, but near the end of the stroke, it engages with a spring 44 coiled around shaft 37 and bearing against a fixed collar 45 thereon, and after compressing this spring, causes the shaft 37 with the pusher 36 to move forward in synchronism with the plunger 15. Thus, the scrap tobacco T and long-filler tobacco T' are fed simultaneously into the wide outlet end 16 of the measuring chamber and, at their junction, will mingle together into a continuous layer before reaching the cutting chamber 12, especially if the lengths of long-filler tobacco are cut zigzag-wise by a corrugated cutter in the magazine-filling machine.

On the return stroke of the slide 39 the arm 43 engages with a fixed collar 46 and thereby causes the shaft 37 to slide back into its original position, the pawl 47 of the pusher 36 being spring-tensioned so as to slip over the links of the chain 23 during its retreating movement.

Having filled the charge transfer 12, the composite tobacco layer is compressed by the vertical plunger 48 and cut into a bunch charge by the scrap bunch knife 49, and is then rolled within a binder to form a cigar bunch as in the scrap bunch machine.

Another arrangement of the magazine feed is shown in Figs. 4 to 7, Fig. 4 corresponding with Fig. 10, and Fig. 5 corresponding with Fig. 9 of the scrap bunch machine patent referred to. In this case, the magazines 50 are placed in a vertical position and the reciprocating vertical rod 51 in pedestal frame 52 of the scrap bunch machine is made use of to operate the long-filler feed. The rod 51 is cam operated from the drive of the machine and carries the cutting chamber plunger or slide 48 which, together with other parts of the plunger unit, has been reduced in width to make room for the long-filler feed. The magazine 50 is supported in the vertical position by an elbow casting 53 and by a bracket 54, both attached to parts of the frame 52. The magazine near its lower end is provided with a number of spaced windows 55 through which fingers 56 enter into the long-filler tobacco T' in the magazine. The fingers 56 are affixed to crank arms 57 mounted on a vertical shaft 58 slidably supported in bearings 59 and 60 of the brackets 53 and 54, respectively. The shaft 58 is tensioned downwardly by a coil spring 61 which is so fastened to bracket 54 and one of the arms 57 as to also exert torsion on the arms 57 tending to move the fingers 56 into the windows 55. The hub of the uppermost arm 57 has a lateral extension 62, Fig. 6, through which passes a vertical adjusting screw 63 carried by a plunger 64 slidable in a stationary support 65 attached to guide bar 66 of slide 48. The plunger 64 has a groove 67 which is in engagement with a cam piece 68 of slide 48 during the entire travel of the slide except in the topmost position of the latter when it dwells before starting its downward stroke. Near the lower end of slide 48 is attached a lifter block 69 so placed as to register with the screw 63 when the plunger 64 is in its innermost position shown in dotted lines in Fig. 6, i. e., when the cam piece 68 is in groove 66 of plunger 64.

In Fig. 4, the full lines show the feeding fingers 56 in the top position of slide 48, at the moment when cam piece 68 has just cleared groove 66 in plunger 64. At this moment, the torsion of spring 61 causes plunger 64 to slide outward, thereby pushing fingers 56 into the windows 55 of the magazine and moving screw 63 off the block 69. The pressure of spring 61 then will push the shaft 58 with the arms 57 downward, feeding long-filler tobacco from the magazine into the cutting chamber. On the down stroke of slide 48, the cam piece 68 re-enters the groove 66 in plunger 64, thereby moving the plunger inward, as shown in Fig. 6, thus pulling the fingers 56 out of the magazine and moving screw 63 back into the path of lifter block 69. At the end of the down stroke, the cam piece 68' is still in the plunger groove, as shown in dotted lines in Fig. 4, hence the screw 63, which at that time is in its lowermost position 63', has remained in the path of lifter block 69', as shown in Fig. 7, so that on the up stroke, the shaft 58 is raised into operating position, thereby compressing the spring 61 which then is ready to feed the next charge of long-filler tobacco when released at the end of the up stroke.

When the chamber 12 is filled by the simultaneous action of the scrap feed and long-filler feed, the knife 49, to which in this case a separate long-filler knife 70 is attached, descends, thereby severing the bunch charge, ready to be transferred to the rolling table.

To make sure that the tobacco above the windows 55 of magazine 50 follows the feed in the lower end, a weight 71 is inserted into the top of the magazine after the same has been attached to the scrap bunch machine. This weight is provided with a long stem 72 carrying a cross-piece 73 which comes to rest on the walls of the magazine when the weight 71 has come down to the first window, thereby preventing damage to the fingers 56 which would result if the weight would descend beyond the top of the window opening.

What is claimed is:

1. In a cigar machine, the combination with means for assembling scrap tobacco and long filler tobacco to form a column of tobacco, of mechanism for separating bunch charges from the assembled tobacco, said means including a horizontal measuring chamber having a portion of its length narrowed and adapted to admit a supply of scrap tobacco, a detachable magazine coextensive with said narrowed portion and containing a supply of long-filler tobacco, and members for simultaneously compacting the tobacco in said narrowed portion and magazine and thereby forming a column of tobacco in the unnarrowed portion of the measuring chamber wherein the long-filler tobacco merges into the scrap tobacco and is disposed at one side of the column.

2. In a cigar machine, the combination with a measuring chamber, of a charge transfer having rigid unyielding walls and adapted to receive a charge from said chamber, an endless member having pushers adapted to compact the tobacco in the chamber and feed it into said transfer, and yielding means for periodically driving said member, said means including a yielding member arranged to advance said endless member and to yield when the tobacco advanced into said transfer has been compacted to a predetermined density.

3. In a cigar machine, the combination with a measuring chamber, of a charge transfer adapted to receive a charge from said chamber, an endless member having pushers adapted to compact the tobacco in the chamber and feed it into said transfer, and yielding means for periodically driving said member, and a device for relatively moving said measuring chamber and endless member to engage said pushers with the tobacco in said measuring chamber.

4. In a cigar machine, the combination with means for confining a mass of tobacco, of an endless member having pushers adapted to compact the tobacco in said confining means, and mechanism for actuating said member to compact the tobacco in said means to a predetermined density and permit yielding of said pushers upon attainment of said predetermined density, said mechanism including a yielding member engaging said endless member for advancing said endless member with said pushers.

5. In a cigar machine, the combination with means for confining a mass of tobacco, of an endless member having pushers adapted to compact the tobacco in said means, and mechanism for actuating said member to compact the tobacco in said means to a predetermined density and permit yielding of said pushers upon attainment of said predetermined density, said member and means being relatively movable to disengage said pushers from the tobacco in said means.

6. In a cigar machine, the combination with a magazine adapted to receive a supply of tobacco, of means for compacting the tobacco in said magazine, said magazine being provided with a movable support whereon it is detachably mounted for movement into and out of the range of action of said means.

7. In a cigar machine, the combination with a magazine adapted to receive a supply of tobacco, of means for compacting the tobacco in said magazine, said means including an endless chain provided with pushers arranged to engage and compact the tobacco in said chamber, and a reciprocating member engaging said chain to intermittently advance the same and compact the tobacco in said magazine, and a reciprocating support on which said member is yieldingly mounted to cause said pushers to compact the tobacco in the magazine to a predetermined density.

8. In a filler feed for cigar bunch machines, an elongated detachable long filler magazine which is open at at least one end, said magazine being of a length sufficient to afford a source of supply of filler for a considerable number of cigars without replenishment, a charge measuring chamber aligned with an open end of said magazine, means operating on the filler tobacco in said magazine over a substantial portion of its length yieldingly urging the filler therein toward said charge chamber with a predetermined pressure, so as to feed sufficient filler into said measuring chamber for one charge under a predetermined compression, and means for separating a measured volume of compressed filler in said chamber from the remainder of said filler to form a measured charge, said filler urging means comprising a series of filler penetrating elements spaced along the length of said magazine, and means imparting to each of said elements movement into the filler and then to the discharge end of said magazine while maintaining the element in the magazine.

9. In a filler feed for cigar bunch machines, an elongated detachable long filler magazine which is open at at least one end, said magazine being of a length sufficient to afford a source of supply of filler for a considerable number of cigars without replenishment, a charge measuring chamber aligned with an open end of said magazine, means operating on the filler tobacco in said magazine over a substantial portion of its length yieldingly urging the filler therein toward said charge chamber with a predetermined pressure, so as to feed sufficient filler into said measuring chamber for one charge under a predetermined compression, and means for separating a measured volume of compressed filler in said chamber from the remainder of said filler to form a measured charge, said filler urging means comprising a series of filler penetrating elements spaced along the length of said magazine and means imparting to each of said elements movement into the filler and to the discharge end of said magazine under predetermined yielding pressure while maintaining the element in the magazine, and movement out of said filler.

10. In a cigar machine, the combination with means for assembling two separate horizontally aligned columns of scrap tobacco and long filler tobacco respectively alongside and in contact with each other, of separate members for compacting both columns simultaneously to intermingle the adjacent sides of both columns at their forward ends and thereby form a composite layer, and mechanism for separating composite bunch charges from the compacted composite layer.

11. In a cigar machine, the combination with means for assembling two separate horizontally aligned columns of scrap tobacco and long filler tobacco respectively alongside and in contact with each other, of yielding means for compacting both columns simultaneously to intermingle the adjacent sides of both columns at their forward ends and thereby form a composite layer, and mechanism for separating composite bunch charges from the compacted composite layer, said means operating to assemble the separate tobacco columns in such relationship to each other that long filler tobacco will lie at the head ends of the bunch charges separated from said layer.

12. In a cigar machine, the combination with chambers respectively containing different grades of tobacco, of a charge transfer arranged to receive tobacco from each of said chambers at different portions of its length respectively, separate yielding members for simultaneously compacting the tobacco in each of said chambers respectively, and thereby forcing the tobacco from each of said chambers into said transfer to fill various portions of the length of said transfer with different grades of tobacco and intermingle the juncture of said various portions within said transfer, and a knife for separating said intermingled portions within said transfer from the remainder of the tobacco in said chambers.

HENRY H. WHEELER.